United States Patent [19]
Nonweiler et al.

[11] Patent Number: 4,757,384
[45] Date of Patent: Jul. 12, 1988

[54] VIDEO SIGNAL PROCESSING SYSTEMS
[75] Inventors: Brian R. G. Nonweiler; Robin D. Crane, both of Newbury, Great Britain
[73] Assignee: Quantel Limited, Kenley, Great Britain
[21] Appl. No.: 721,716
[22] Filed: Apr. 10, 1985
[30] Foreign Application Priority Data
  Apr. 25, 1984 [GB] United Kingdom ............... 8410596
[51] Int. Cl.⁴ .............................................. H04N 5/14
[52] U.S. Cl. .................................... 358/160; 358/22
[58] Field of Search ............... 358/160, 22, 185, 180, 358/163, 182, 167, 166, 170; 340/727, 728, 747; 382/46, 47, 44

[56] References Cited
U.S. PATENT DOCUMENTS
2,999,127  9/1961  Fisher ................................. 358/170
4,163,249  7/1979  Michael et al. ..................... 358/167
4,302,776 11/1981  Taylor et al. ....................... 358/160
4,563,703  1/1986  Taylor et al. ....................... 358/160
4,590,520  5/1986  Frame et al. ....................... 358/163

Primary Examiner—James J. Groody
Assistant Examiner—David E. Harvey
Attorney, Agent, or Firm—Cooper & Dunham

[57] ABSTRACT

A video processing system in which the shape or size of an image can be altered by providing a map of address signals representing the addressess in the store to which input video signals must be written to produce the desired change. These addresses can be manipulated so that there are a number of changes to the image. Where there is an expansion in the image the address signals are filtered to prevent picture break up. The incoming video signals are written into the filtered addresses and then new picture points are interpolated to produce the desired expansion.

10 Claims, 7 Drawing Sheets

AREA CALCULATION

Fig. 2. (PART 1)

Fig.2. (PART 2)

VIDEO SIGNAL PROCESSING SYSTEMS

BACKGROUND OF THE INVENTION

This invention relates to video signal processing systems, especially though not exclusively for producing so called production effects in television.

In our co-pending Patent Application No. 8306789, which corresponds to U.S. application Ser. No. 475,790, there is described a video signal processing system in which production effects are produced by writing input video signals, received in television raster format, into storage locations of a frame store so chosen that, when the signals are subsequently read from the storage locations in television raster format, the signals are re-arranged in the raster to alter the image in shape, size or position, or in some other way. A change in size may for example produce the effect of a zoom in or out; and the zoom may be accompanied by some other effect such as rotation or scroll. In order to achieve the selection of storage locations for the input signals, a shape store is provided containing, at positions which correspond to respective pixel positions in the television raster, address signals identifying storage positions in the frame store at which the input video signals should be written in order to achieve the desired effect. A set of address signals describing a desired shape or other characteristic of an image is called an address map. Normally the address map is only coarsely subdivided, comprising, say, an address for each eighth pixel, in each eighth line of a frame. Sequences of address maps are provided to produce changing effects, successive maps in a sequence describing, say, every fourth field. The addresses are thus distributed on a coarse grid, and interpolating means are provided to produce addresses for the intervening pixels and also for the intervening fields. This allows addresses to be read at a rate less than "real time", but to be used after interpolation for writing the input video signals on the frame store in real time.

The stored maps are entered in the shape store from a computer having a keyboard or other control means by which desired production effects can be entered into the computer. The computer is arranged to generate the addresses for desired maps under software control.

Each storage location in the frame store in which the rearranged video signals are written will correspond to a pixel in the output signal television raster. However, in general, an address provided by the computer and the interpolating means will not coincide with a storage location in the frame store but will lie within a rectangular area defined by four storage locations. Therefore on writing an input video signal (relating to a pixel in the input signal raster) in the frame store, it is usually necesssary to distribute the signal among four storage locations by interpolation (this interpolation being different from the address interpolation previously referred to). This means that up to four storage locations have to be accessed for each address. As a corollary, each storage location has to be accessed a plurality of times in response to different addresses.

The system described in the aforesaid patent application represents a powerful means of producing video effects in real time. A difficulty may however be encountered when the effect produced comprises or includes a zoom in.

Figure 1:
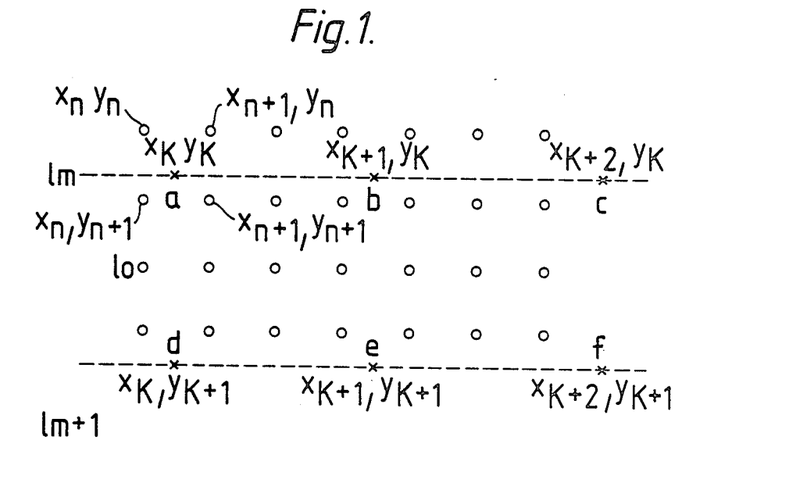

As the zoom progresses, the addresses provided by the computer and the interpolating means move further apart so that the separation of the addresses for adjacent input pixels may exceed the separation of storage locations in the frame store. When this occurs some storage location in the frame store will not receive any contributions from the input pixels or may receive only a partial contribution, and the image when produced appears to break up. This is illustrated in FIG. 1 of the accompanying drawing in which a number of storage locations in the frame store are represented by small circles. The addresses of a few of the location are represented as $x_n, y_n; x_{n+1}, y_n; x_n, y_{n+1};$ and $x_{n+1}, y_{n+1}$ respectively. The crosses on the other hand represent a few addresses provided by the computer and the interpolating means for pixels of the input video signals. The addresses denoted in the drawing as $x_k, y_k; x_{k+1}, y_k$ and $x_{k+2}, y_k$ comprise the addresses, or three successive pixels, a, b and c in one line $l_n$ of the input signals, whilst the addresses $x_k, y_{k+1}; x_{k+1}, y_{k+1}$ and $x_{k+2}, y_{k+1}$ comprises the addresses for three successive pixels, d, e and f in the next line $l_{m+1}$ in the same field of the input signals.

As each input pixel arises in the input video signals it is written at the address provided for it by the computer and the interpolating means, such writing being achieved, as may be illustrated by the pixel a, by distributing the pixel to the four neighbouring storage locations in the frame store, namely in the case pixel a, the locations at $x_n, y_n; x_{n+1}, y_n; x_n, y_{n+1}$ and $x_{n+1}, y_{n+1}$ the distribution being effected in proportions related to the overlap of the pixel a on notional pixels at the neighbouring storage locations. The output video signals, incorporating the required production effect, are derived by reading the signals stored in the storage locations in television raster format. This is the case illustrated in FIG. 1, the output signals are derived by reading the signals from successive location in line $l_m$ and then in line $l_{m+1}$, and similarly for other lines.

Consideration of FIG. 1 will reveal that it represents the production of a zoom in, the zoom factor as between the output and input signals being less than 1:2. The figure also shows that many of the storage locations in the frame store will receive no contributions from the input pixels, such as the locations on line $l_o$ and the column $C_o$. This leads to apparent break up of the image, when the output signals are reproduced.

This undesirable phenomenon is not confined to zoom in effects and may occur locally in a picture when a shape change leads to magnification of part of the image. As already indicated, it may also occur whilst the image is being rotated or otherwise shifted in position or changed in shape.

SUMMARY OF THE INVENTION

The object of the present invention is to overcome the disadvantage indicated, and according to the present invention there is provided a video signal processing system comprising:

storage means having storage locations for storing video signal pixels write means for writing pixels of input video signals in selected addresses, read means for sequentially reading pixels stored in said storage locations to derive output video signals, selector means for providing write addresses for said write means so that said output video signals represent the same image as the input video signals but with a desired change imparted thereto, which change may include a change in the size of the image or a part thereof, said selector means being so arranged that the spacing of the addresses for said write means can be limited in such a way as to reduce the risk of break-up in the image represented by said output signals; and means for interpolating among said output video signals in such a way as to produce a desired expansion of the image represented by said output signals.

BRIEF DESCRIPTION OF DRAWINGS

The invention can be readily applied in video signal processing systems such as described in co-pending United Kingdom Patent Application No. 8410181, which corresponds to U.S. application Ser. No. 713,028, and in order that the invention may be more clearly understood and readily carried in effect one example of it, applied to such a system will now be described with reference to the accompanying drawings, in which:

FIG. 1 has already been referred to.

FIG. 2 (Part 1) and FIG. 2 (Part 2) illustrate mainly in block form, said example of the invention. The combination of these two figures is referred to as FIG. 2 below.

DETAILED DESCRIPTION OF INVENTION

Figure 2:
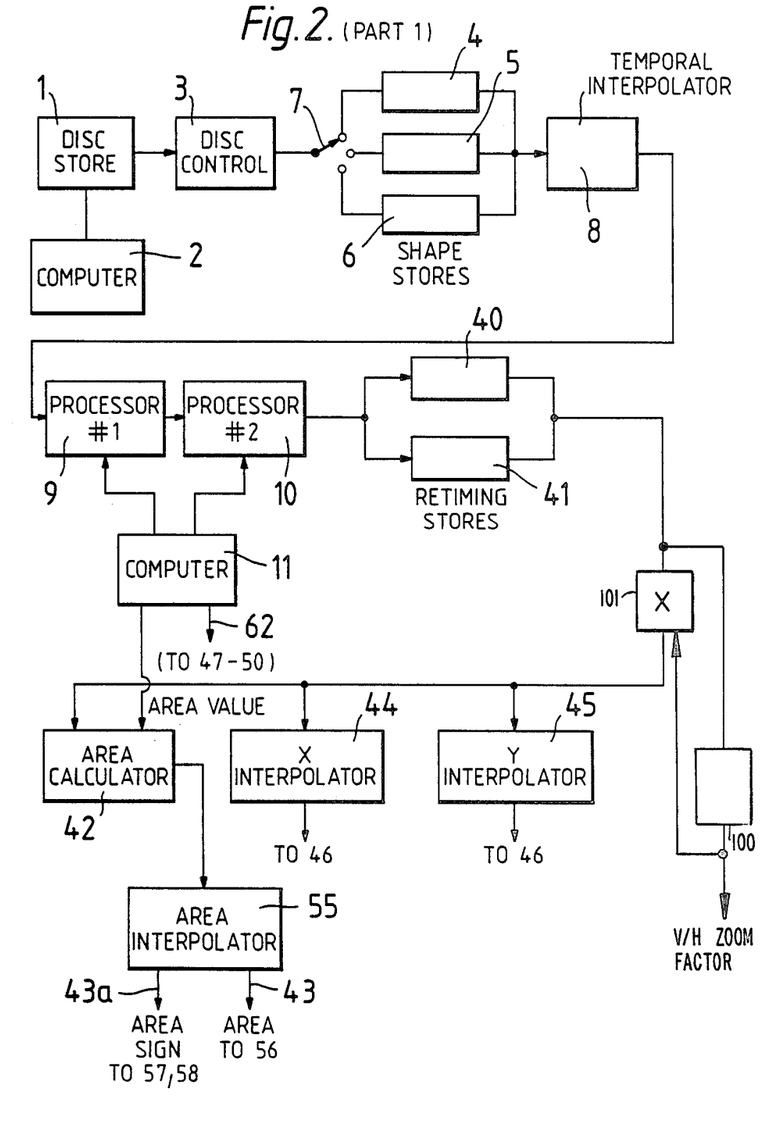
Figure 3:
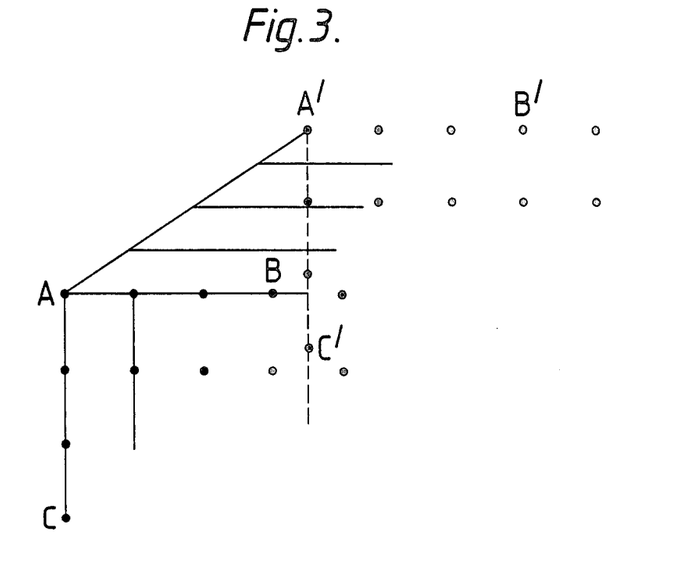
FIGS. 3 and 4 are diagrams explanatory of the operation of FIG. 2.

Reference to the drawings:

Reference 1 in FIG. 2 denotes a shape library for storing predetermined groups of signals defining write addresses relative to a television raster. The library is in the form of a magnetic disc store and it is arranged to store a three dimensional address for each pixel on a coarse grid which makes up a map of a shape, and a map is provided, say for every fourth television field in a sequence making up one continuous effect. Each dimension of an address comprises a 16 bit word, of which 1 bit is a flag bit the purpose of which need not be discussed in this application. In FIG. 3, the dots in the frame ABC (only partly shown) represent pixel positions in the television raster of the system. It is to be understood that the pixels represented comprise only every eighth pixel on every eighth line, and the store 1 stores a three dimensional address for each such pixel. Assuming that the address map for the frame ABC is one of a sequence predetermined to effect transformation of the output image through a sequence of shapes, other address maps are stored for subsequent frames, such as A'B'C' which is represented as being the fourth field after ABC. Some of the pixels for which addresses are represented are also shown on this frame. Reference 2 denotes the computer used to generate the addresses in response to commands, introduced via a keyboard or other input means such as a touch tablet. The controller for the disc store 1 is indicated by the reference 3. The disc store has, of course, the capacity to store many other maps or sequences of such maps.

Address signals read from the disc store 1 are applied via the controller 3 selectively to three 20,000 word shape buffer stores 4, 5 and 6 via switching means indicated diagrammatically at 7. The switch is phased by the sequencer for the system (not shown), so that address maps are fed in sequence to the three buffers from the store 1, one map in successive period comprising four fields. During any one such period, therefore, address maps are available in two of the buffers, whilst a new address map is in course of being written into the third buffer. This gives adequate time for addressing the disc store despite its relatively slow rate of operation compared with the television pixel rate. During the period in question, the two buffers, say 4 and 5 already containing address maps are read in parallel into a temporal interpolator 8 which produces, by interpolation, four coarse grid address maps, one in each of the four field periods, from, say the frame ABC to the frame A'B'C' in FIG. 2. It will be understood that the addresses in both maps ABC and A'B'C' will contribute more or less to the interpolated addresses as the frame timing advances from that of ABC to that of A'B'C', hence the description "temporal" interpolation. The interpolator 8 may be of the form described in our co-pending Patent Application No. 8306789, which corresponds to U.S. application Ser. No. 475,790. The interpolated address maps are fed out, frame by frame, to a first processing circuit 9.

It will be understood that at this point the address maps are still coarse maps and that the address signals are three dimensional.

The processing circuit 9 (FIG. 5) is arranged to manipulate address signals received from the interpolator 8, so as to produce the effect of movement of the respective image shape. The manipulated signals are then passed to a second processing circuit 10, which is arranged to convert the three dimensional address signals to two dimensional address signals related to a single image plane, with perspective. Assume that a three dimensional shape, described by a particular coarse address map, is represented by 64×100 co-ordinates in each of x, y and z. In this description, x is the along-line co-ordinate, y the across-line co-ordinate and z the co-ordinate normal to the image plane. To move the three dimensional shape, 4×4 matrix transforms are used, three for producing rotations about the axis and three for producing translations along the axis.

The transforms for rotations are as follows:

1. Rotation about $x$ axis $\begin{bmatrix} 1 & 0 & 0 & 0 \\ 0 & W & X & 0 \\ 0 & Y & Z & 0 \\ 0 & 0 & 0 & 1 \end{bmatrix}$ 2. Rotation about $y$ axis $\begin{bmatrix} W & 0 & -X & 0 \\ 0 & 1 & 0 & 0 \\ -Y & 0 & Z & 0 \\ 0 & 0 & 0 & 1 \end{bmatrix}$ 3. Rotation about $z$ axis $\begin{bmatrix} W & X & 0 & 0 \\ Y & Z & 0 & 0 \\ 0 & 0 & 1 & 0 \\ 0 & 0 & 0 & 1 \end{bmatrix}$ Where $W = \cos\theta$, $X = (-\sin\theta)$
$Y = \sin\theta$, $Z = \cos\theta$ The tranforms for displacement are as follows:

1. $x$ translation
$$\begin{bmatrix} 1 & 0 & 0 & 0 \\ 0 & 1 & 0 & 0 \\ 0 & 0 & 1 & 0 \\ X & 0 & 0 & 1 \end{bmatrix}$$

$X$ = translation distance

2. $y$ translation
$$\begin{bmatrix} 1 & 0 & 0 & 0 \\ 0 & 1 & 0 & 0 \\ 0 & 0 & 1 & 0 \\ 0 & Y & 0 & 1 \end{bmatrix}$$

$Y$ = translation distance

3. $z$ translation
$$\begin{bmatrix} 1 & 0 & 0 & 0 \\ 0 & 1 & 0 & 0 \\ 0 & 0 & 1 & 0 \\ 0 & 0 & Z & 1 \end{bmatrix}$$

$Z$ = translation distance

Any desired move in 3 dimensions can be defined by multiplying a number of the above basic transforms and it is to be noted that, due to the nature of matrix multiplication, the order in which the transforms are multiplied is critical. The processing circuit 9 is arranged (as will appear) to apply the resultant movement transform to the three dimensional coarse map from the interpolator 8 as twelve coefficients. The coefficients themselves are evaluated in computer 11 which is arranged to perform the matrix multiplication. The particular multiplications which are performed in the computer 11 are determined by operator control of a joystick or other means by which the producer can signal a desired movement of the image shape to the system. The manipulation of one line of the coarse map (for a particular field) can be represented as follows:

$$\begin{bmatrix} x_1 & y_1 & z_1 & 1 \\ x_2 & y_2 & z_2 & 1 \\ . & & & . \\ . & & & . \\ . & & & . \\ x_{100} & y_{100} & z_{100} & 1 \end{bmatrix} \begin{bmatrix} a_1 & b_1 & c_1 & d_1 \\ a_2 & b_2 & c_2 & d_2 \\ a_3 & b_3 & c_3 & d_3 \\ a_4 & b_4 & c_4 & d_4 \end{bmatrix}$$

The quantities a,b,c etc. are the coefficients evaluated by the matrix multiplication. The d column is not in fact used and as a general result the co-ordinates, after manipulation to effect the image movements, can be expressed as follows, for a representative address (after movement) $x_i'$, $y_i'$, $z_i'$:

$$x_i' = a_1 x_i + a_2 y_i + a_3 z_i + a_4$$

$$y_i' = b_1 x_i + b_2 y_i + b_3 z_i + b_4$$

$$z_i' = c_1 x_i + c_2 y_i + c_3 z_i + c_4$$

Figure 4:
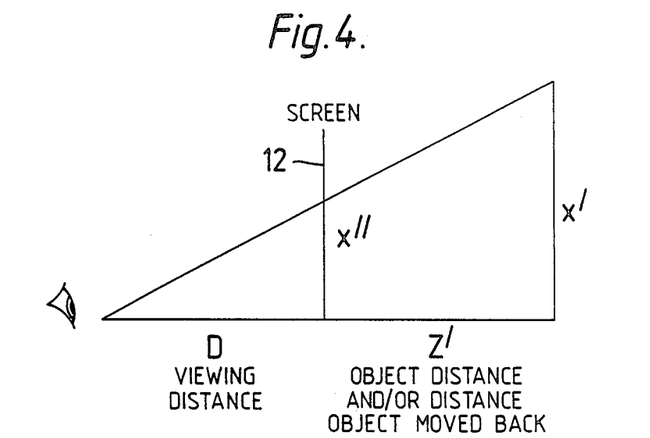

Reference will now be made to FIG. 4 to explain the operation of the second processor 10 in converting manipulated addresses produced by the processor 9 from three dimensions to two dimensions. This shows the x and z co-ordinates x' and z' respectively of an address calculated by the processor 9 (the y co-ordinate y' not being visible on the drawing). The line 12 represents the position of the image plane (the viewing screen of the television receiver) on which the image is to be projected for viewing and D represents the viewing distance. The figure illustrates that to produce the two dimensional image on the image plane, with correct perspective, the co-ordinate x' has to be converted to x", and the corresponding y co-ordinate similarly converted to y=. The drawing shows that:

$$\frac{x''}{D} = \frac{x'}{z' + D}$$

therefore $$x'' = \frac{x'D}{z' + D}$$
$$= \frac{x'}{\frac{z'}{D} + 1}$$

similary $$y'' = \frac{y'}{\frac{z'}{D} + 1}$$

The quotient $(z'/D) + 1$ is in fact produced directly in the processor 9 by pre-multiplying all the $c_i$ coefficients by 1/D and adding 1. Hence referring to the equation for $z_i'$ above.

$$z'' = \frac{z_i'}{D} + 1 = \frac{c_1 x_i}{D} + \frac{c_2 y_i}{D} + \frac{c_3 z_i}{D} + \frac{c_4}{D} + 1$$

then:

$$x'' = \frac{x'}{z''} \text{ and } y'' = \frac{y'}{z''}$$

or:

$$x'' = \frac{x' \cdot 1}{z''} \text{ and } y'' = \frac{y' \cdot 1}{z''}$$

In the processor 10, the quantity 1/z" is derived using floating point arithmetic.

Figure 5:
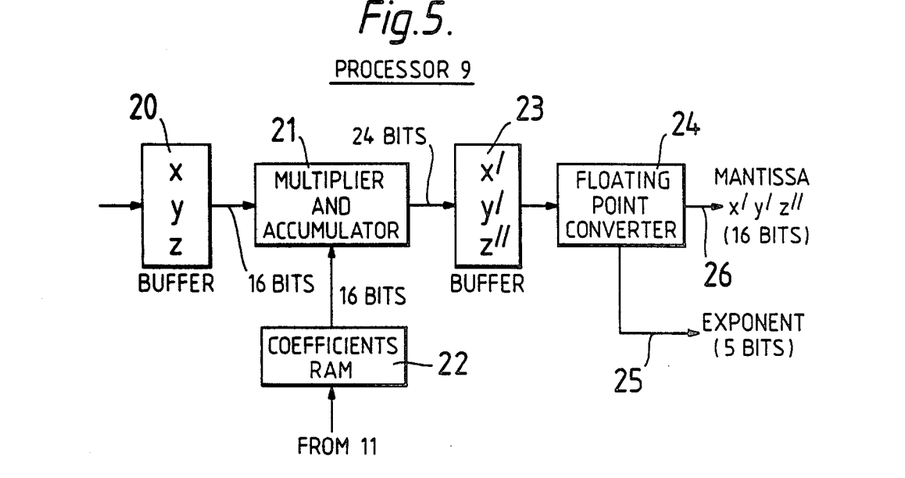
FIGS. 5 and 6 illustrates parts of FIG. 2 in greater detail.
Figure 6:
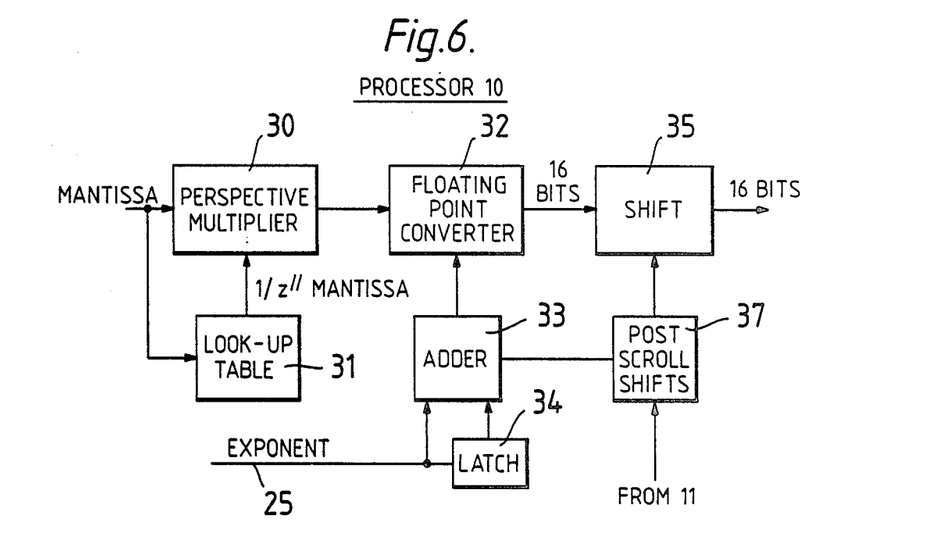

The manner in which the foregoing algorithms are applied is illustrated in FIGS. 5 and 6. According to FIG. 5 which illustrates the processor 9, the x,y,z, address signals in the form of 16 bit words from the temporal interpolator 8 are fed to a buffer 20 and thence are read into a multiplying and accumulating circuit 21, in which are performed the evaluations of x', y' and z' referred to above. The twelve coefficients required for each address evaluation are derived by the matrix multiplications previously referred to, which are carried out, as stated, in the computer 11 and delivered to a coefficients RAM 22, from which they are applied, as 16 bit words to the circuit 21. The output signals from the circuit 21, are 24 bit words comprising successive addresses each consisting of the three co-ordinates x', y' and z". These signals are temporarily held in a buffer store 23 before being applied to a floating point converter 24 the output of which, for each co-ordinate of an address, comprises an exponent of 5 bits on the output 25 and a mantissa of 16 bits delivered on the output 26.

The second processing circuit, comprises, as shown in FIG. 6, a multiplier 30 and a look up table 31. The output 26 from FIG. 5, is applied in parallel to the multiplier 30 and the look up table 31. The look up table responds to the mantissa of each z co-ordinate to derive the mantissa of $1/z''$ and applies this to the multiplier 30, where it is multiplied by the corresponding $x'$ and $y'$ mantissae. The products are fed to a floating point converter 32. The respective exponents of each product, appearing on the output 25 of the processor 10, are added in the adder 33, the earlier exponent being delayed by latch 34 as required. The sum of exponents from the second input to the converter 32 and the 16 bit $x''$ and $y''$ outputs of the converter, with fixed point, is applied to a shift circuit 35. This receives post scroll signals from a generator 37 which in response to commands from the computer 11, moves the origin of the co-ordinates from the centre of the image plane to the origin required for the raster scan.

Reverting to FIG. 2, the output of the processor 10 comprises the two dimensional addresses on the coarse address grid to which pixels video signals should be transferred in the output raster; these addresses depend both on the shape and the movement to be imparted to the input image. These addresses are applied alternately to further shape stores 40 and 41, during alternate field periods and are read therefrom, also during alternate field periods but in inverse order. The read circuits of the stores 40 and 41 serve to retime the address signals video in sequence related to the order in which the addresses are required in an area calculating circuit 42, and in a circuit 100 for signalling when the spacing of the addresses exceeds a predetermined threshold. The circuit 100 will be described in more detail later.

Figure 7:
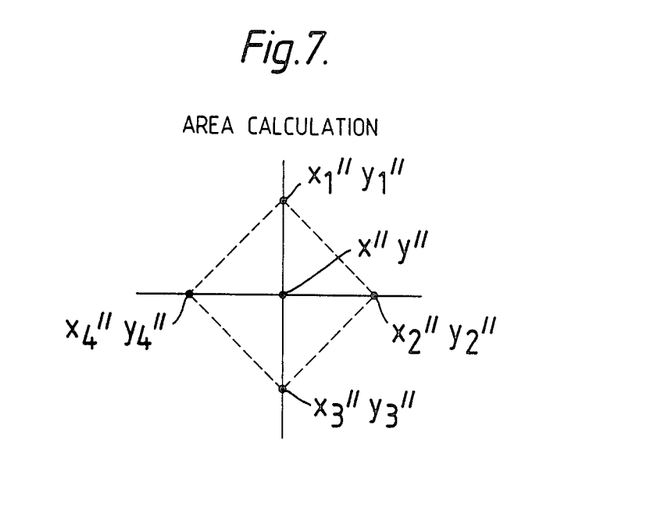
FIG. 7 is another diagram explanatory of the operation of FIG. 2.

The retimed address signals are read, via a multiplying circuit 101, to the said area calculating circuit 42 which is arranged to calculate for each address (as multiplied in 101) the area of the meshes in the address grid at that address. The function of the multiplier 101 will be explained subsequently and for the present it will be assumed that the multiplier is set to multiply by 1, so that the addresses from the stores 40 and 41 are unaltered. In FIG. 7 a representative address for a given input pixel is $x_o''$, $y_o''$ and the address for pixels above, to the right, below and to the left on the coarse address grid are $x_1''$, $y_1''$, $x_2''$, $y_2''$, $x_3''$, $y_3''$, and $x_4''$, $y_4''$, respectively. These four addresses derived from the store 40 or 41 are employed in the circuit 42 to calculate the mesh area at the address x, y using the following algorithm (omitting the primes for convenience:

$$\text{Area} = (x_2 + x_1)(y_2 - y_1) + (x_3 + x_2)(y_3 - y_2) + (x_4 + x_3)(y_4 - y_3) + (x_1 + x_4)(y_1 - y_4)$$

The calculation is repeated for each "coarse" address, the figures from the stores 40 and 41 being read to the calculator 42 in the correct order to produce the required area calculations. It is to be noted that the area is a signed quantity.

The x and y components of the address signals from the stores 40 and 41 are fed to respective X and Y interpolators 44 and 45 to produce for each pixel in the input signal raster respective x and y components of the address which the respective video signal should occupy in the output signal raster. The address for pixels in odd and even numbered lines are produced during alternate field periods. The two interpolators are each similar to the interpolator described with reference to FIG. 8 of our co-pending patent application No. 8306789, which corresponds to U.S. application Ser. No. 475,790. Consider an interpolated address for one pixel such as $x_k$, $y_k$ denoted in FIG. 1. As already indicated, this address does not coincide with the address of a storage location in the frame store from which the output signal is derived. It will however, lie within the rectangle defined by four such addresses, denoted in the representative case of FIG. 7 as $x_n$, $y_n$; $x_{n+1}$, $y_{n+1}$ and $x_{n+1}$, $y_{n+1}$. The interpolated address for each pixel is applied to a calculator 46 (FIG. 2 part 2) which may comprise a look up table, which produces, for each interpolated address, signals representing four neighbouring addresses as defined above and applied them as address signals to four frame stores 47 to 50. The calculator 46 also produces four fractional address signals which are applied to multiplying circuits 51 to 54 respectively. These fractional addresses are related to the area of overlap of a pixel at address $x_k$, $y_k$ on the pixels at the neighbouring addresses. The fractional addresses may be derived with the aid of a variety of interpolation functions, as will be known to persons skilled in the art. The area calculator 42, as aforesaid, produces signals representing the mesh area at the coarse addresses as defined by the address signals from the stores 40 and 41. These signals are applied to an area interpolator 55 (FIG. 2, part 1) which is arranged to produce for each pixel in the input signal raster an interpolated signal called a density compensation coefficient K. This signal is applied, for each pixel, to a multiplying circuit 56 (FIG. 2, part 2). The area interpolator 55 also produces, a signal which represents the sign of the mesh area for each pixel and this signal is applied via connection 43a to two input gates 57 and 58 to select for application to the multiplier 56 one or other of two sources 59 and 60 of input video signals, for a reason to be described subsequently. Assume, for the present, that gate 57 is open and input video signals are received from the source 59 and applied to the multiplier 56. The video signal for each pixel multiplied by the coefficient K, is applied in parallel to the four multiplying circuits 51 to 54, where it is multiplied by the fractional addresses. The resultant fractions of the video signal are then applied in the stores to the respective addresses $x_n$, $y_n$; $x_{n+1}$, $y_n$; $x_n$, $y_{n+1}$; and $x_{n+1}$, $y_{n+1}$, as indicated in FIG. 7, to produce the required spatial interpolation of the video signal. Write command signals for each pixel are applied to the four stores in parallel at the appropriate times by the computer 11.

As the writing of the input video signals in the store 47 to 50 continues through a frame period all the addresses in each of the stores will receive, unless the expansion is large, a fractional part (which may be 1 or 0 in some cases) of successive video signals. The same address in the four frame stores 47 to 50 will receive the interpolated fractions from four input pixels required to build up the output video signal at the respective address. The output signals as derived by applying sequential address signals and corresponding read command signals from the computer 11, by way of the connection 62, to read the four fractional signals from successive identical addresses in the four frame stores. The four fractions are added in the adding circuit 63 to form the output video signal. It will be understood that reading occurs from one field of pixels in each frame store at the same time as writing occurs in the other field of pixels, the functions being alternated at field rate. The sequence of video signals read from the adding circuit 63 therefore represent the same image as the input video signals, but with a alteration determined by the address maps read from the store 1, and with such movement as may be introduced by the processors 7 and 10. The re-addressing of the video signals may cause the density of video signals applied to pixels in the output signal raster to vary as a function of the shape alterations or movements of the image. The multiplier 56, however, amplifies or attenuates the video signals in inverse proportion to the signal density to avoid undesired change in brightness over the image.

If the signal from the computer 11, representing the sign of the area derived by the calculator 42, changes sign, this indicates that the image changes from outside to the inside of a surface. For example, on rotating a hollow cylinder using the processors 9 and 10, different parts of the outside and inside surfaces of the cylinder may become visible as the rotation progresses. To deal with a situation such as this the sources 59 and 60 are arranged to provide video signals representing the outside surface and inside surface respectively, and the area-sign signals select the video signals for different pixels of the output raster, depending on the sign signal.

Figure 8:
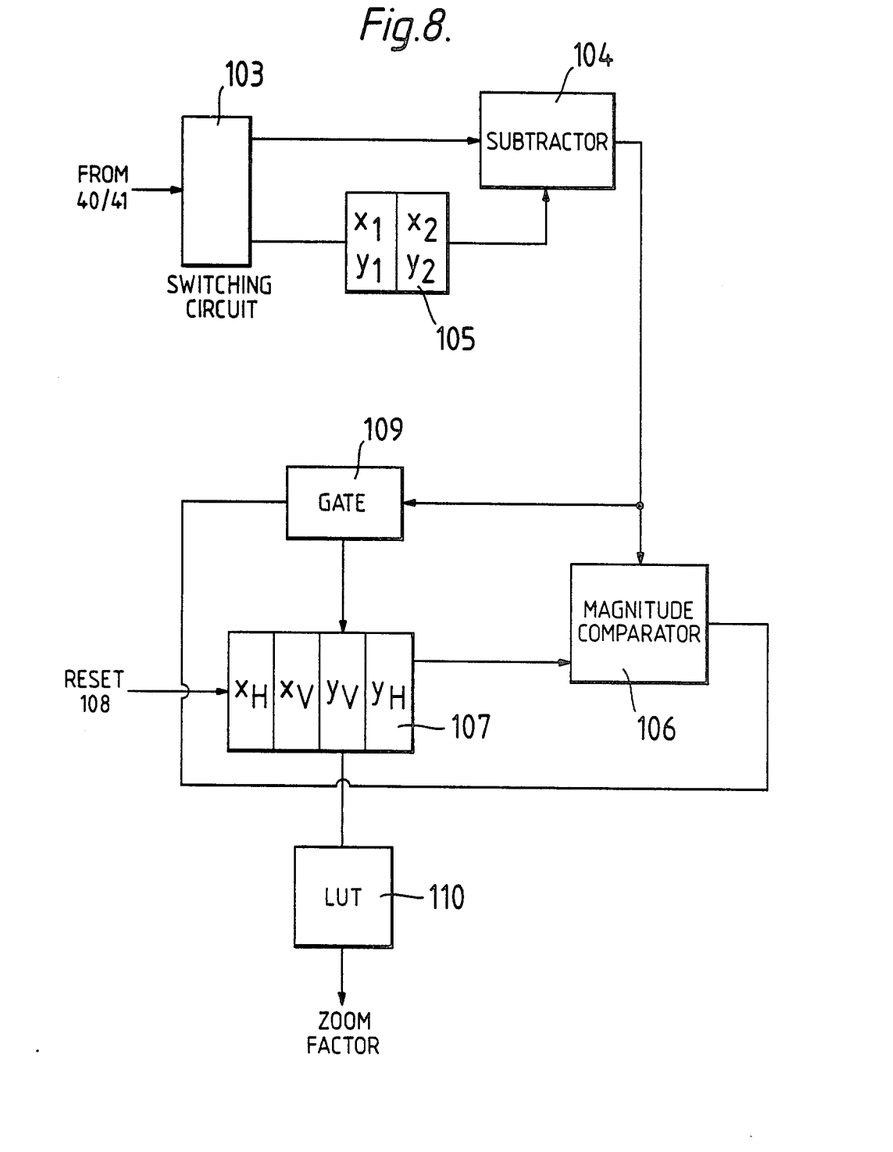
FIG. 8 illustrates in greater detail means involved in post-interpolation.

In accordance with the present invention, the output video signals are applied to a post-reading interpolating means 103, the operation of which is responsive to a zoom signal from the signalling circuit 100. The circuit 100 is arranged to examine the maximum degree of horizontal expansion and the maximum degree of vertical expansion requested by the address signals from the store 40 or 41 during each field period. If either degree of expansion exceeds a respective predetermined threshold, the circuit delivers a signal called a horizontal zoom factor, or vertical zoom factor as the case may be. The threshold is set in each case to correspond to a degree of expansion which would begin to cause the image represented by the output signals to break up (as explained with reference to FIG. 1) if no steps are taken to prevent it. Each zoom factor signal is in practice arranged to to be unity or less than unity and to represent the picture compression required to prevent the breakup. If a horizontal zoom factor signal is delivered by the circuit 100 it is applied to the mutiplier 101, which operates in such a way as to multiply the x component of each address from the store 40 or 41 by the zoom factor, thus reducing the horizontal spacing in the addresses sufficiently to avoid picture breakup. At the same time, the zoom factor is applied as a control signal to the post-read interpolating circuit 103, to compensate for this reduction in spacing by interpolating further pixels in each line of the output signals in such a way as to expand the image represented by the output signals in the x direction by the inverse of the zoom factor. A similar effect is produced if a vertical zoom factor signal is delivered by the circuit 100, although in the case the image is expanded in the y-direction. Furthermore the image is expanded in both x and y directions if both horizontal and vertical zoom factors are produced by the circuit. As shown in FIG. 8, the circuit 100 comprises a digital subtracting circuit 104 and a two stage latch 105. Referring to FIG. 7, the order of reading the coarse address signals from the store 40 or 41 for application to the area calculator 42 for the purpose of calculating the mesh area at the address $x_o$, $y_o$ (again omitting the primes for convenience) is arranged to be $x_1$, $y_1$; $x_2$, $y_2$; $x_o$, $y_o$; $x_3$, $y_3$; $x_4$, $y_4$; $x_o$, $y_o$;

The latch 105 and the subtracting circuit 104 are controlled by the sequencer of the system to produce the following results. The address components $x_1$, $y_1$ and $x_2$, $y_2$ are written in the latch 104 and then subtracted respectively from the $x_o$ and $y_o$ in the subtracting circuit 104 to produce the following differences:

$x_o - x_1 = x_V$ $y_o - y_1 = y_V$ $x_o - x_2 = x_H$ $y_o - y_2 = y_H$

If there is no expansion (or contraction) between the input and output images, the difference $x_V$ and $y_H$ would be zero and $y_V$ and $x_H$ would be 8.

The difference of $x_H$ and $x_V$ is a measure of average along-line separation of adjacent addresses between $x_1$, $y_1$ and $x_2$, $y_2$, expressed as a number of storage locations on the frame stores 47 to 50. Similarly the difference of $x_V$ and $y_H$ is a measure of the average across-line separation of adjacent addresses between $x_1$, $y_1$ and $x_2$, $y_2$. The operation described is repeated for other groups of three addresses from the stores 40 and 41, such as $x_3$, $y_3$; $x_4$, $y_4$; $x_o$, $y_o$; and so on.

Each group of four signals $x_H$, $x_V$, $y_V$ $y_H$ is fed in sequence to a magnitude comparator 106 in which it is compared with the respective one of four signals from a four stage store 107. The stages of this store are provided for storing the maximum values of $x_H$, $x_V$, $y_V$ and $y_H$ occurring in any field period. At the beginning of each field period all stages of the store 107 are reset to zero by a reset input 108. When signal $x_V$ is applied from circuit 104 to the comparator 106 it is compared with the signal in the $x_V$ stage of the store 107. If the applied signal is the greater, a gating signal is applied from the comparator via the connection 140 to a gate 109 which is opened and causes the applied signal to be written in $x_V$ stage of the store 107 in place of the signal already there. It will be appreciated that this mode of operation will cause the signal stored in $x_V$ stage at the end of any field period to be the maximum value of $x_V$ to occur during the field. The same is true of signals in the $x_H$, $y_V$ and $y_H$ stages of the store 107. At the end of the field period, the stored maximum values of $x_H$, $x_V$, $y_V$, $y_H$ are read out and applied to a look up table 110, which in response to these maximum values provides horizontal and vertical zoom factors for the next field period. If the difference of $x_H$ and $x_V$ is below the threshold value at which picture break up is liable to occur, the horizontal zoom factor provided by the look up for the next field will be unity and the multiplying circuit 101 and the input read interpolating circuit 103 will be without effect on the operation of the circuit during that field. Similarly if the difference of $y_V$ and $y_H$ is below the threshold value the vertical zoom factor provided by the look up table will be unity. If on the other hand, the signals $x_H$ and $x_V$ and/or $y_V$ and $y_H$ indicate a liability to picture break up the respective horizontal zoom and/or vertical zoom factor selected by the look up table 110, will be greater than unity and the horizontal component and/or vertical components of the addresses read from the store 40 or 41 during the respective field period will be reduced by the respective zoom factor to inhibit the picture breakup. At the same time the post-read interpolating circuit 103 becomes operative.

Figure 9:
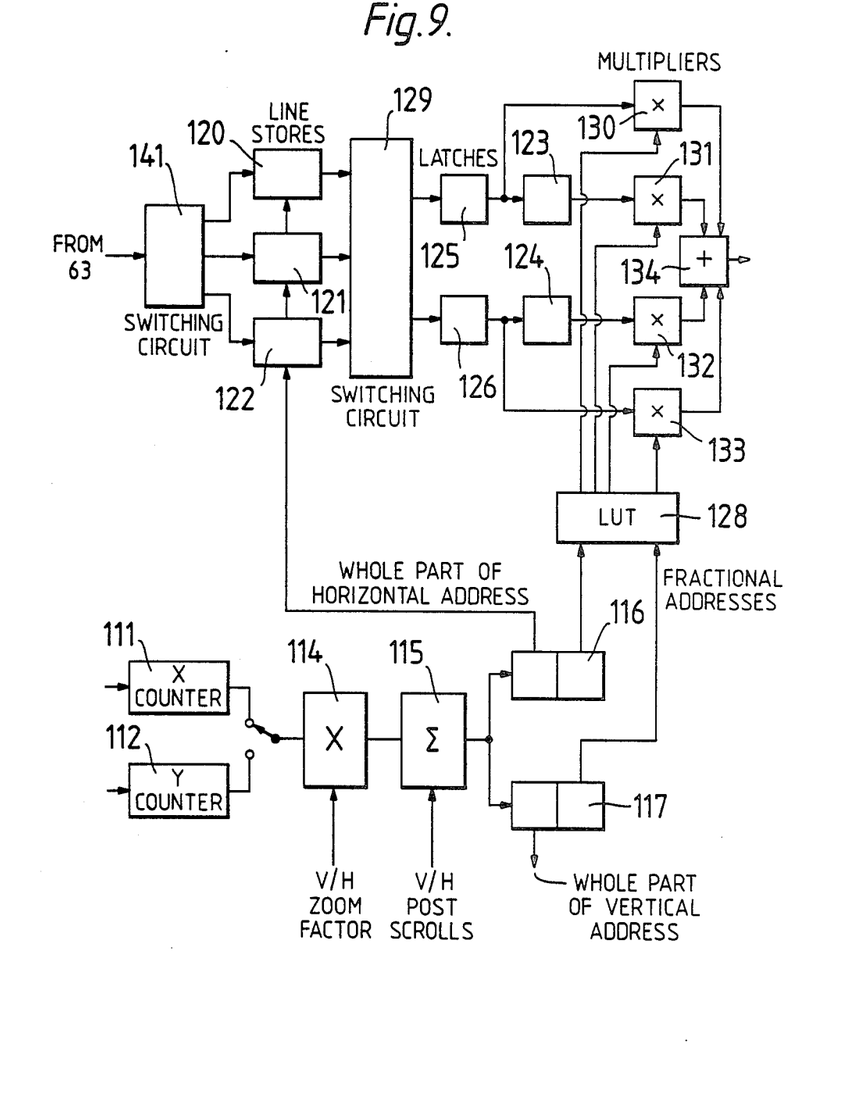
FIG. 9 illustrates in greater detail means for producing compensative interpolation among the output video signals.

As shown in FIG. 9, the post-read interpolating circuit 103 comprises an address generator including an X counter 111 and a Y counter 112. The X counter counts pixel clock pulses and the Y counter counts line pulses. The counts of these counters are applied via a time multiplexing switch 113 to a multiplying circuit 114 to which are fed, at the respective times, the horizontal and vertical zoom factors from the look up table 110. During the line periods the scrolled 113 is switched so that the pixel count, multiplied by the horizontal zoom factor (which is unity or less than unity) is applied to an address circuit 115 to which is applied a horizontal post-scroll signal. This signal represents a fixed offset for the pixel count, so that the pixel or x-address can be shifted selectively to an intermediate position on the image plane. During the line-return intervals, the switch 113 is switched so that the line count from the Y counter is multiplied by the vertical zoom factor and applied to the adding circuit 114, when it is added to the vertical post-scroll signal, to produce the line or y-address. The pixel or x-address and the line or y-address are fed respectively to latches 115 and 116. The factors used in the multiplying circuit 113 may lie in the range from 1 to $\frac{1}{2}^{16}$ so that up to 63,556 pixels can be interpolated between two pixels in adjacent storage positions on the stores 47 to 50. The addresses stored in the latches 116 and 117 will in general comprise a whole part (0, 1, 2 ...) and a fractional part and the horizontal components of each address will increase steadily through each line period in a field, whilst the vertical component will increase from line period to line period. The increase in each case will depend on the respective zoom factor and may be from 1 to $\frac{1}{2}^{16}$.

The post-reading interpolative circuit 103 also comprises three line stores 120, 121 and 122. These are connected to adding circuit 63 by way of switch 141 which is controlled by the sequencer of the system in such a way that successive lines of pixels read from the stores 47 to 50 are written in cyclic order in the stores 120, 121 and 122. Thus during each line period after the second in any field, two lines of pixels are available for interpolation in two if the line stores, say 120 and 121. The vertical address of the lines read from the stores 47 to 50 is controlled by the whole part of the count stored in the latch 117. So that say line n is stored in store 120 and line n+1 is stored in store 121. The whole part of the address in the x-address latch is applied as a read address to the two line stores available for reading, that is 120 and 121 in the case considered. Assume that the whole part of the address is m; when this address occurs the pixel from location m in the line is read into latches 123 and 124 whilst the pixels in position m+1 are read into latches 125 and 126. The necessary switching to achieve the described operation is carried out in switching circuit 129. The reading from the stores 120, 121 and 122 is carried out nondestructively since each line has to be read several times from those stores, depending on the zoom factors. The fractional parts of x and y addresses in the latches 116 and 117 serve as fractional addresses for the purpose of interpolation, and they are applied to a look up table 128 which produces four interpolation coefficients for application of four multipliers 130 to 133. These multipliers are also fed with the pixels temporarily held in the latches 123 to 126 and the pixels are multiplied with the interpolation coefficients. The products from the four multipliers are in turn fed to an adding circuit 134 which combines the four products to synthesise the value a pixel located at the address identified, at any instant, by the address (whole and fractional) stored in the latches 116 and 117. It is believed that the process of interpolation will be understood from the foregoing description related to FIGS. 1 and 2, so that it need not be further described. However, it will be considered that the arrangement described in FIG. 9, by the interpolation described, compensates for the effect of inhibition on expansion produced by the circuit 100 and multiplier 101 shown in FIG. 2. If the zoom factors are both unity, the circuit illustrated in FIG. 9 will produce no effect other than some delay in the output signal. The circuits of FIGS. 8 and 9 will of course return automatically to the transparent condition when the zoom factor returns below the threshold.

In the system described herein with reference to the drawings, a multiplier 101 is responsive to the zoom factor signals from the circuit 100 to reduce the spacing of the addresses derived from the stores 40, 41 if the maximum spacing tends to exceed the spacing of the storage locations in the frame stores 47–50. The multiplier is however not essential. The horizontal and vertical zoom factors are implicit in the signal processing carried out in other parts of the system, as for example in the signal processor 9. In an alternative form of the system therefore the processor 9 and/or other address-processing circuits is/or controlled so as to ensure that the respective zoom factors relevant to any particular field do not go beyond the threshold at which break-up would start. In this alternative the processor 9 or some other address-processing circuit is arranged to provide horizontal and vertical multiplier signals representing the expansion required in the final image to produce a desired overall expansion. These signals are caused to multiply the zoom factor signals as derived by the circuit 100, before the interpolation of the output video signals occurs. The operation of the arts of the system illustrated in FIGS. 8 and 9 is otherwise unchanged.

In some examples of a system such as described it may not be desired to inhibit pre-writing expansion, as for example when it desired to produce the effect of an explosion. To meet this situation, means may be proposed to automatically inhibit operation of the circuit 100 on a selective basis.

When carrying out post-reading interpolation, it may be required to read only part of the total number of lines of pixels from the frame stores 47 to 50. Advantage may be taken of the line periods when reading is not occurring to erase, or return to reference, those remaining lines of storage breakups in the frame stores, and also any parts of other lines not used in the interpolation.

We claim:

1. A video signal processing system comprising:

storage means having storage locations, identified by respective addresses, for storing an input video signal comprising pixels in line and frame format;

write means for writing pixels of said input video signal in storage locations of said storage means which are identified by write addresses;

read means for sequentially reading pixels stored in said storage locations to derive an output video signal comprising pixels in line and frame format;

means for providing desired write addresses for said write means to change the position of pixels as between said input video signal and said output video signal to produce a desired change in the image represented thereby, wherein said change includes a change in the size of the image or a part thereof;

selector means including means for determining the spacing between said desired write addresses, means for producing a factor signal related to said spacing and modifying means for utilizing said factor signal to modify said desired write addresses so as to limit said spacing to avoid break-up of said image, wherein said modified addresses are applied to said write means to identify the storage locations for the pixels of said input video signal; and interpolating means responsive to said factor signal for interpolating among the pixels of said output video signal in such a way as to produce an expansion of the image represented by said output video signal.

2. A video signal processing system as claimed in claim 1, wherein said selector means further includes means for multiplying said desired write addresses by a signal related to said factor signal, if said factor exceeds a threshold value, so that the spacing between the addresses is limited.

3. A video signal processing system as claimed in claim 2 wherein said interpolating means includes input means for said factor signal and means for interpolating said output signal so that the output image is expanded by an amount determined by the inverse of said factor signal.

4. A video signal processing system as claimed in claim 1, wherein means are provided to selectively inhibit the operation of said modifying means and said interpolating means.

5. A video signal processing means according to claim 1, wherein said means for producing a factor signal includes means for deriving signals respectively representing the horizontal and vertical spacing of neighboring desired write addresses, and said modifying means utilizes both said signal representing said horizontal spacing and said signal representing vertical spacing.

6. A video signal processing means comprising:
means for receiving an input video signal comprising pixels representing an image in line and frame format;
means for providing data defining a desired presentation of said image;
means for determining when said desired presentation represents expansion of said image above a predetermined threshold;
means for modifying the data to limit the expansion of said image, or part thereof, when said presentation represents expansion of the image above said predetermined threshold;
pixel storage means;
means responsive to the data from said modifying means for storing received pixels in said storage means;
means for reading said pixels from said storage means; and
means for interpolating among the pixels read from said storage means when said presentation represents an expansion above said threshold to produce an image having said desired presentation.

7. A video system comprising:
a source of a video signal representing an input picture;
means for defining a desired manipulation of the input picture to transform it into an output picture;
means for providing a control signal if at least some portion of the output picture would correspond to a transformation of the input picture beyond a selected transformation threshold;
means for tranforming the input picture to the output picture which comprises (i) means responsive to the absence of the control signal to carry out the manipulation defined by the means for defining a desired manipulation and thereby generate said output picture, and (ii) means responsive to the presence of the control signal to carry out a modification of the manipulation defined by the means for defining a desired manipulation and thereby generate a modification of said output picture; and
means responsive to the presence of said control signal for transforming said modification of said output picture into said output picture;
in which said predetermined transformation threshold is a picture magnification factor.

8. A video system as in claim 7 in which said modification corresponds to a transformation of the input picture within said predetermined transformation threshold.

9. A method comprising the steps of:
providing video signals representing an input picture;
defining a desired manipulation of the input picture to transform it into an output picture;
defining a selected transformation threshold;
if the defined manipulation would not transform the input picture beyond the selected threshold, transforming the input picture into the output picture; and
if the defined manipulation would transform the input picture beyond the selected threshold, transforming the input picture into an intermediate output picture in a transformation which does not exceed the selected threshold and transforming the intermediate output picture into said output picture;
in which the selected threshold is a magnification factor.

10. A method as in claim 9 in which the selected magnification factor corresponds to transforming said input picture into an output picture which is substantially free of picture breakup.

* * * * *